United States Patent
Su et al.

(10) Patent No.: US 6,916,099 B2
(45) Date of Patent: Jul. 12, 2005

(54) REARVIEW/DISPLAY MIRROR ASSEMBLY

(75) Inventors: Wen-Wei Su, Taoyuan (TW);
Kuel-Hung Chen, Taoyuan (TW);
Shun-Hsiang Hsiao, Taoyuan (TW);
Hsien-Jen Wu, Taoyuan (TW)

(73) Assignee: Exon Science, Inc., Taoyuan (TW)

( * ) Notice: Subject to any disclaimer, the term of this patent is extended or adjusted under 35 U.S.C. 154(b) by 157 days.

(21) Appl. No.: 10/453,630

(22) Filed: Jun. 4, 2003

(65) Prior Publication Data

US 2003/0227689 A1 Dec. 11, 2003

(30) Foreign Application Priority Data

Jun. 7, 2002 (TW) ........................................ 91112345 A

(51) Int. Cl.⁷ ............................. G02B 5/08; G02B 5/26; G02B 27/14
(52) U.S. Cl. ........................ 359/839; 359/883; 345/7
(58) Field of Search ................................ 359/629, 630, 359/839, 883, 884; 345/7, 905

(56) References Cited

U.S. PATENT DOCUMENTS

| | | | |
|---|---|---|---|
| 4,499,451 A | 2/1985 | Suzuki et al. | |
| 5,253,109 A | * 10/1993 | O'Farrell et al. | ........... 359/604 |
| 5,416,313 A | 5/1995 | Larson et al. | |
| 5,631,638 A | 5/1997 | Kaspar et al. | |
| 5,818,625 A | * 10/1998 | Forgette et al. | ............. 359/267 |
| 6,106,121 A | 8/2000 | Buckley et al. | |
| 6,356,376 B1 | 3/2002 | Tonar et al. | |

FOREIGN PATENT DOCUMENTS

| | | |
|---|---|---|
| DE | 196 31 409 A1 | 2/1998 |
| EP | 1 195 624 A2 | 4/2002 |
| GB | 2 099 628 A | 12/1982 |
| JP | 11-339953 | 12/1999 |
| JP | 2000-340360 | 12/2000 |
| TW | 263564 | 4/1995 |
| TW | 451834 | 9/2000 |

OTHER PUBLICATIONS

Abstract, Taiwanese Patent Publication No. 263564.
Abstract, Taiwanese Patent Publication No. 451834.
Abstract, DE 196 31 409 A1 dated Feb. 1998.
Abstract, JP11–339953 dated Dec. 1999.
Abstract, JP2000–340360 dated Dec. 2000.

* cited by examiner

Primary Examiner—Mark A. Robinson
(74) Attorney, Agent, or Firm—Bacon & Thomas

(57) ABSTRACT

A mirror assembly for optional rearview and display includes a specific material of a reflective layer. The reflective layer is made of a multi-layer film such as $SiO_2$/metal/$SiO_2$ or $TiO_2$/metal/$TiO_2$, and preferably has a transmittance of 15%~60%. Accordingly, the driver can see the objects at his side on the mirror via the reflection of the reflective layer as well as the active information provided by the display behind the mirror. The active information includes speed information, turning information and/or backing-up information.

14 Claims, 6 Drawing Sheets

REARVIEW/DISPLAY MIRROR ASSEMBLY

FIELD OF THE INVENTION

The present invention relates to a mirror assembly, and more particularly to a mirror assembly capable of providing rearview and display functions at the same time. The rearview and display functions of the mirror assembly can be achieved by providing a specified reflective layer.

BACKGROUND OF THE INVENTION

Due to the increasing complexity of traffic situations and vehicular functions, there are a lot of information and data required to be timely provided for the reference of the driver. Conventionally, the dashboard in the vehicle is used to show various information. However, frequently keeping eyes on the dashboard while driving is not safe. Therefore, designers attempt to find a better place to show information. A rearview mirror and a windscreen are ones of the best choices.

Please refer to FIGS. 1A, B and C which schematically show the appearance and structure of a conventional rearview mirror with an information display function. In FIG. 1A, it is schematically shown the rearview mirror reflects the image behind the vehicle for the driver's reference. In FIG. 1B, it is schematically shown the rearview mirror not only reflects the image behind the vehicle for the driver's reference but also has the information-displaying function. In order to exhibit the above functions, the structure of the rearview mirror is as shown in FIG. 1C, and principally comprises a light-transmitting glass 10, a reflective layer 11 and a display 12. The light-transmitting glass 10 and reflective layer 11 are used to perform the function of a reflection mirror. The thickness of the reflective layer 11 should be properly controlled so as to allow the light from the actively light-emitting display 12 to penetrate through the reflective layer 11 and the light-transmitting glass and reach the driver's eyes.

Since the conventional reflective layer 11 is made of a metal such as aluminum, silver or chromium, the transmittance is about 7–10%. Due to the low transmittance, the display 12 is required to emit relatively strong light in order to penetrate the reflective layer to show information on the glass 10 of the rearview mirror. It is disadvantageous for power utilization of the vehicle. Therefore, it is the purpose of the present invention to solve the problems encountered by the prior art.

SUMMARY OF THE INVENTION

An object of the present invention is to provide a rearview/display mirror assembly having proper reflectance and transmittance for satisfactory rearview and display effects.

A first aspect of the present invention relates to a rearview/display mirror assembly, which comprises a mirror for showing thereon an image of an object and/or an active information to be observed by a user; a multi-film reflective layer provided at a side of the mirror opposite to the user to allow the image of the object at the same side as the user to be reflected and shown on the mirror; and a display for providing the active information, disposed at a side of the multi-film reflective layer opposite to the mirror, the light emitted therefrom partially penetrating through the multi-film reflective layer to have the active information shown on the mirror.

Preferably, the multi-film reflective layer is a composite layer of metal and silicon dioxide or titanium dioxide, e.g. a silicon dioxide/metal/silicon dioxide or titanium dioxide/metal/titanium dioxide composite layer, wherein the metal in the multi-film layer is selected from aluminum, silver or chromium.

Preferably, the multi-film reflective layer has a transmittance of 15%~60%, and more preferably, 15%~45%.

Preferably, the display is a planar display, e.g. a thin-film electro-luminescence (EL) display, a light-emitting diode (LED), an organic light-emitting diode (OLED), a liquid crystal display (LCD) or a vacuum fluorescent display (VFD). Preferably, the display is a digit planar display such as a thin-film seven-segment display.

Preferably, the rearview/display mirror assembly further comprises a light-absorbing background, which is disposed at a side of the reflective layer opposite to the mirror for absorbing the external light penetrating through the reflective layer so as to avoid the interruption with the display of the image of the object on the mirror.

Preferably, the rearview/display mirror assembly is a vehicular rearview mirror.

In an embodiment, the active information includes a rear clearance data informed by a back-warning radar.

According to a second aspect of the present invention, a rearview/display mirror assembly comprises a rearview mirror for showing thereon an image of an object at the same side as a driver to be observed by the driver; a display disposed at the back of the rearview mirror, and emitting light penetrating through the rearview mirror to provide an active information to be observed by the driver; a metal/silicon dioxide composite layer disposed between the rearview mirror and the display, and having a transmittance of 15%~60%; and a light-absorbing background disposed at a side of the metal/silicon dioxide composite layer opposite to the rearview mirror for absorbing the external light penetrating through the metal/silicon dioxide composite layer.

According to a third aspect of the present invention, a rearview/display mirror assembly comprises a rearview mirror for showing thereon an image of an object at the same side as a driver to be observed by the driver; a display disposed at the back of the rearview mirror, and emitting light penetrating through the rearview mirror to provide an active information to be observed by the driver; a metal/titanium dioxide composite layer disposed between the rearview mirror and the display, and having a transmittance of 15%~60%; and a light-absorbing background disposed at a side of the metal/titanium dioxide composite layer opposite to the rearview mirror for absorbing the external light penetrating through the metal/silicon dioxide composite layer.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1B:
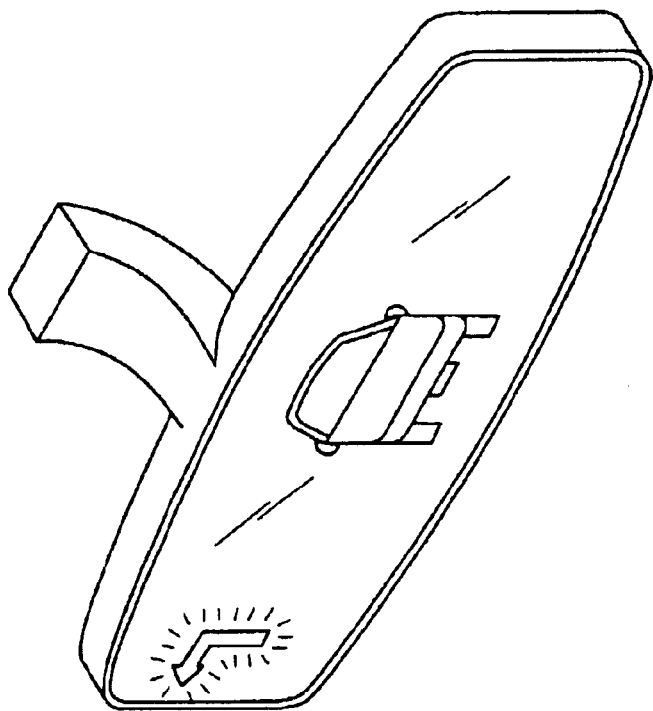
FIGS. 1A, B and C which schematically show the appearance and structure of a conventional rearview mirror with an information display function.
Figure 1A:
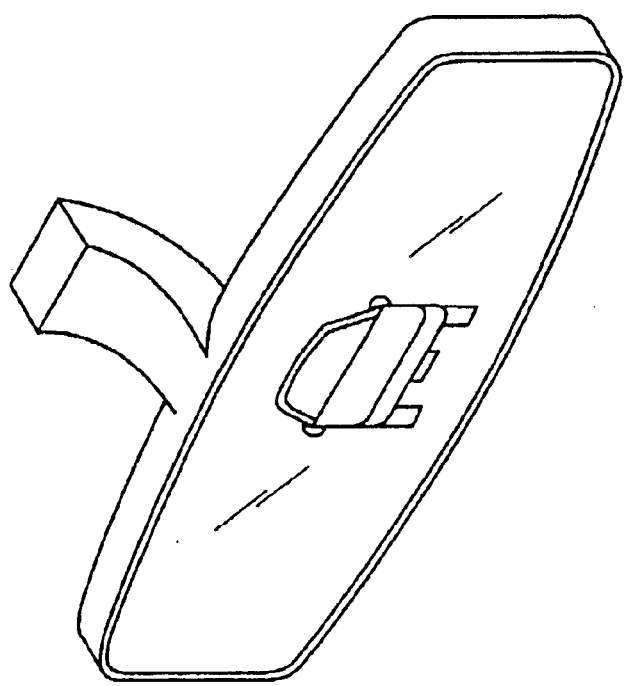
Figure 1C:
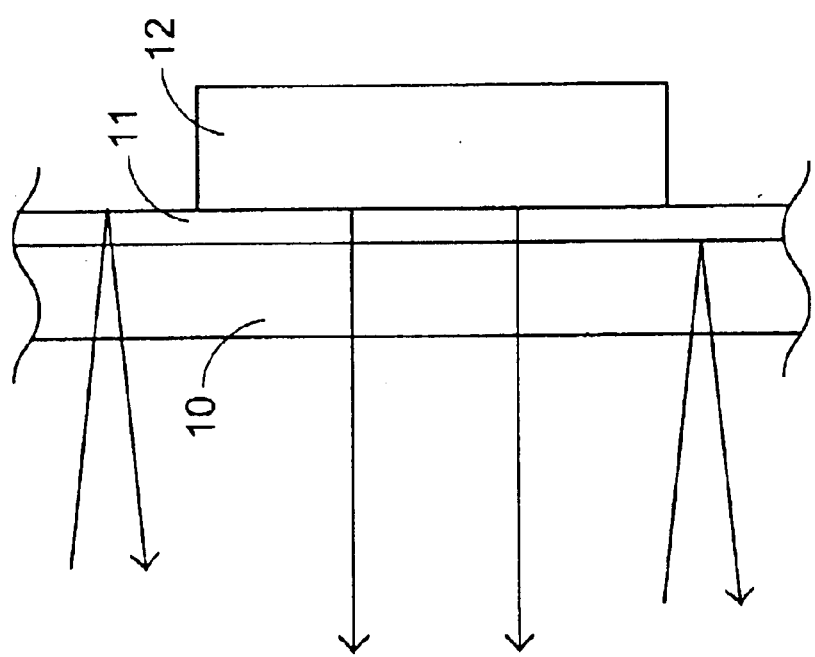
Figure 1C:

As mentioned above, also referring to FIG. 1C, the rearview/display vehicular rearview mirror principally comprises a light-transmitting glass 10, a reflective layer 11 and a display 12. The light-transmitting glass 10 and reflective layer 11 are used to perform the function of a reflection mirror. When the display 12 actively emits light to perform the display function, the light from the display 12 penetrates through the reflective layer 11 and the light-transmitting glass 10 and reaches the driver's eyes. In other words, the reflective layer 11 between the light-transmitting glass 10 and the display 12 should have proper reflectance for showing the image of the rearward cars as well as proper transmittance for penetration of the light from the display so as to provide active information for the driver's reference. Therefore, the reflectance and material of the reflective layer play an important role on the rearview and display effects of the rearview mirror.

Figure 2A:
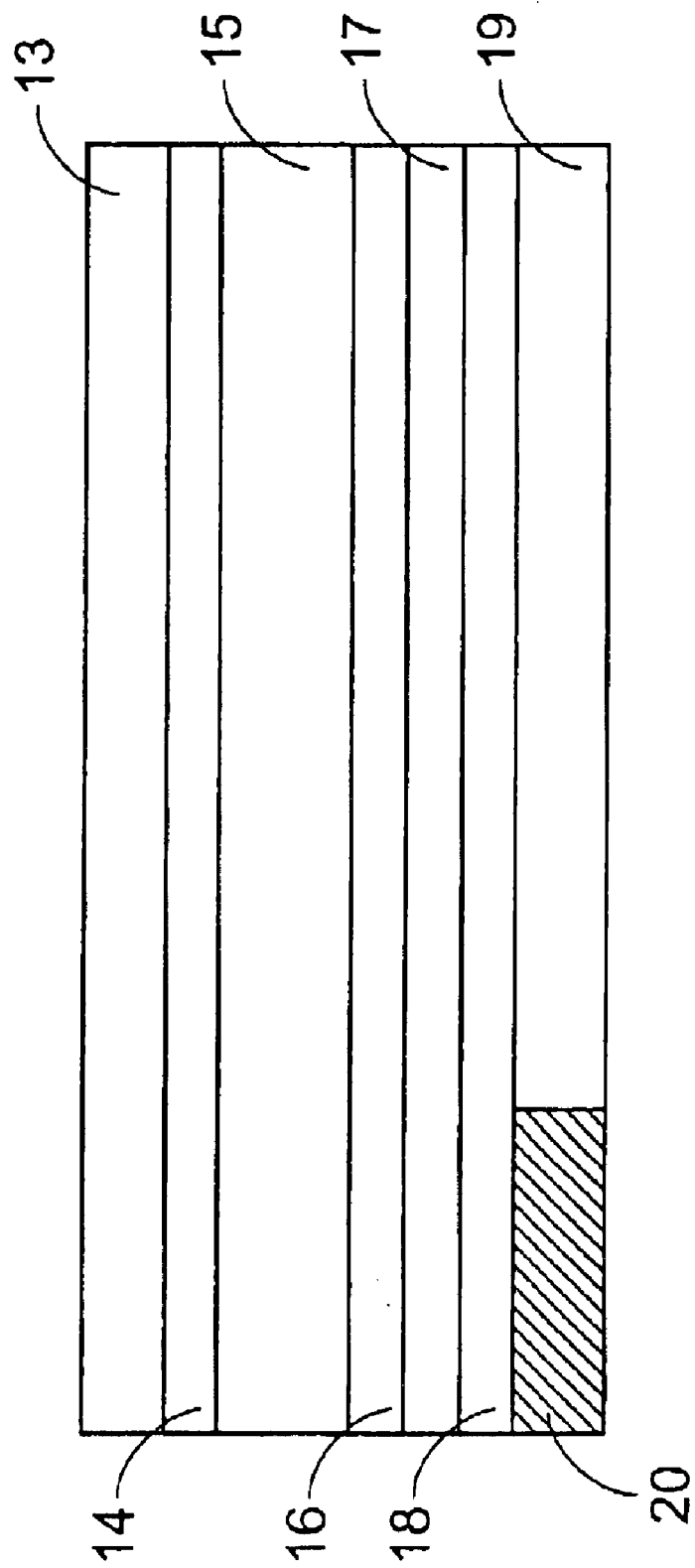
FIG. 2A is a cross-sectional structure diagram of a preferred embodiment of a rearview/display mirror assembly according to the present invention.
Figure 2B:
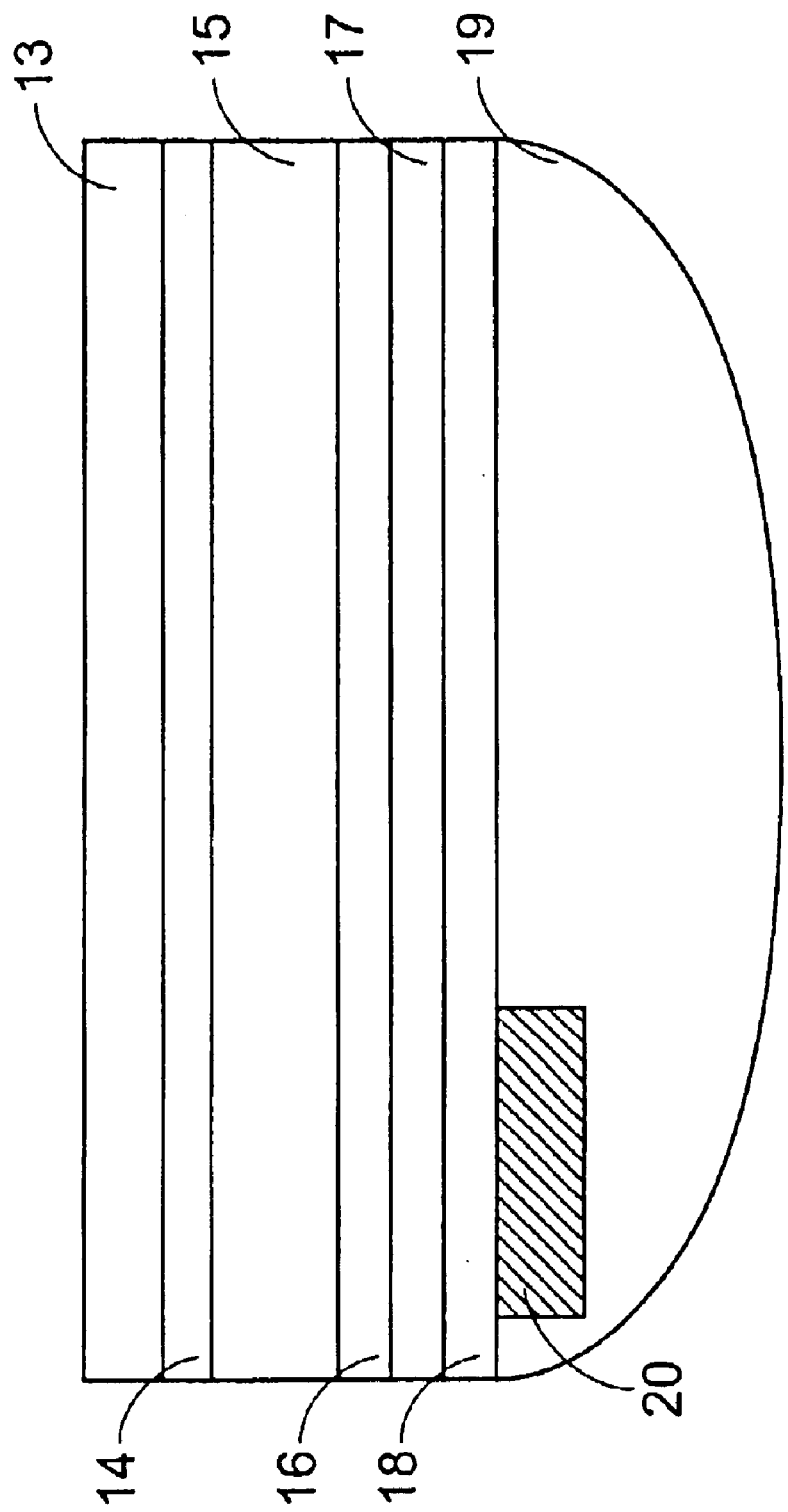
FIG. 2B is a cross-sectional structure diagram of another preferred embodiment of a rearview/display mirror assembly according to the present invention.

A multi-film reflective layer with a transmittance of 15%~60%, preferably 15%~45%, and more preferably about 30%, is suitable for reflecting the image of the rearward cars and displaying active information. Please refer to FIG. 2A or 2B, which is a cross-sectional structure diagram of a preferred embodiment of a rearview/display mirror assembly according to the present invention. The rearview/display mirror assembly includes an indium-tin oxide (ITO) layer 13, a silicon dioxide layer 14, a glass or plastic mirror 15, a silicon dioxide layer or titanium dioxide layer 16, a metal layer 17, a silicon dioxide layer or titanium dioxide layer 18, a back glue or paint coating 19 and a display 20. The ITO layer 13 and the silicon dioxide layer 14 perform the anti-glare effect. The silicon dioxide layer or titanium dioxide layer 16, metal layer 17, and silicon dioxide layer or titanium dioxide layer 18 constitute a multi-film reflective layer. The back glue or paint coating 19 serves as a light-absorption background for preventing from the adverse effect of light leakage on reflection. Of course, if there has already been a dark background capable of absorbing light behind the reflective layer (for example, the black housing 50 as shown in FIG. 2B), the back glue or paint coating 19 is not required any longer. The display can be any suitable display, e.g. liquid crystal display, for showing the desired information.

The above description, although described with reference to a rearview mirror, can be applied to other vehicular or non-vehicular mirrors requiring these functions. Further, the multi-film reflective layer such as silicon dioxide/metal/silicon dioxide reflective layer or titanium dioxide/metal/titanium dioxide reflective layer used in the embodiments is just for exemplification, and can be substituted by any other suitable multi-film reflective layer to achieve the above purpose.

Figure 3A:
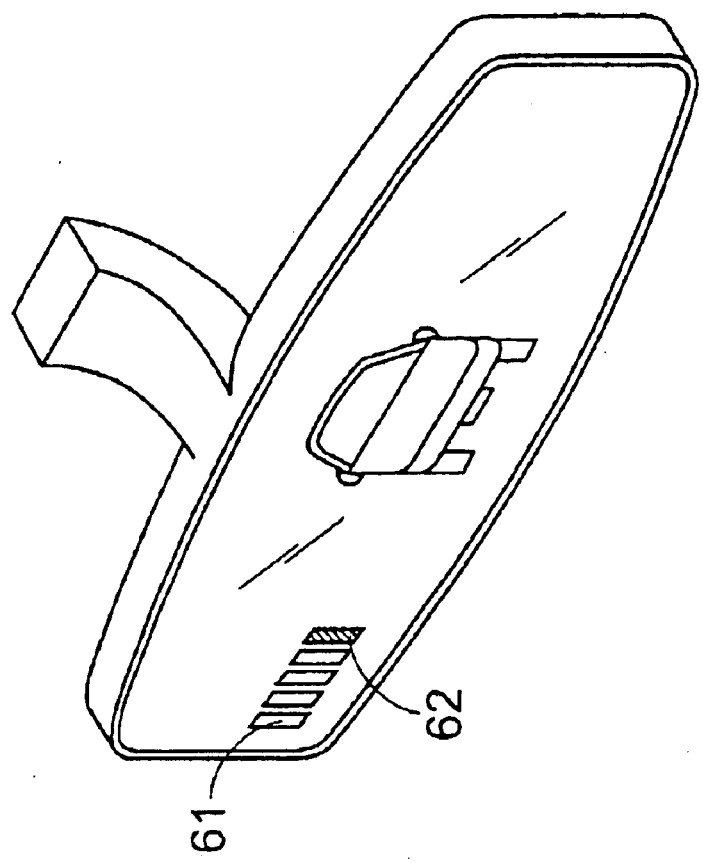
FIG. 3A is a schematic diagram illustrating the information associated with back-warning radar and shown on the rearview/display mirror assembly according to the present invention.
Figure 3B:
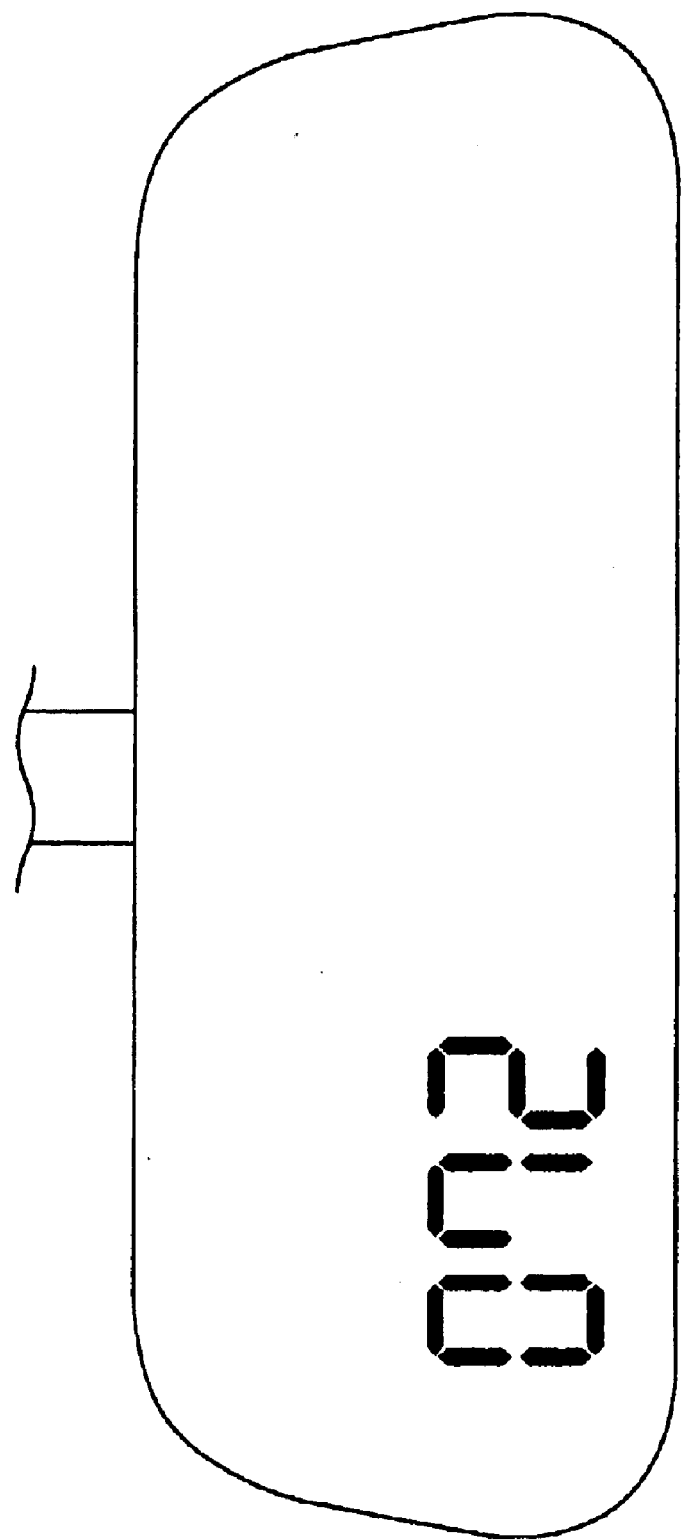
FIG. 3B is a schematic diagram illustrating the information associated with vehicular speed and displayed by a seven-segment display.

By using the present multi-film reflective layer with transmittance of 15%~60%, various active information can be shown on the mirror without consuming much power, and the image of an object can still be reflected and shown on the mirror. For example, as shown in FIG. 3A, a color change of a series of small blocks 61 is one of the ways to show the clearance change. For example, when the vehicle is reversed so as to approach an obstacle therebehind, a red warning block 62 is created by the display and thus shown on the mirror. In another example, a thin-film seven-segment display is used to show the vehicular speed, e.g. "072", on the mirror, as shown in FIG. 3B. By the present invention, an image of an object and/or an active information can be shown on the rearview mirror to be observed by the driver at the same time. Therefore, the driver can exempt from keeping eyes on the dashboard while driving so as to be safe.

In addition to the above-mentioned rear clearance and speed information, other driving data such as revolving rate, heading direction, turning indication, door safety check or illumination check, or other useful data such as temperature, UV index, stereo volume, radio channel or telephone number, etc. can also be shown. The display of these active information can be realized by referring to the co-pending U.S. patent application assigned to the same Assignee and entitled "THIN-FILM ELECTRO-LUMINESCENCE DISPLAY".

Herein, an interior rearview mirror is illustrated for exemplification only, and a similar design can be applied to an exterior rearview mirror or other mirror assemblies. For example, the present rearview/display mirror can be mounted to an electrical appliance to serve as a reflection mirror as well as show information of the electrical appliance such as time or temperature.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rearview/display mirror assembly, comprising:
   a mirror for showing thereon an image of an object and/or an active information to be observed by a user;
   a multi-film reflective layer comprising of silicon dioxide/metal/silicon dioxide composite films or titanium dioxide/metal/titanium dioxide composite films, and provided at a side of said mirror opposite to the user to allow said image of said object at the same side as the user to be reflected and shown on said mirror; and
   a display for providing said active information, disposed at a side of said multi-film reflective layer opposite to said mirror, the light emitted therefrom partially penetrating through said multi-film reflective layer to have said active information shown on said mirror.

2. The rearview/display mirror assembly according to claim 1 wherein said metal in the multi-film layer is selected from aluminum, silver or chromium.

3. The rearview/display mirror assembly according to claim 1 wherein said multi-film reflective layer has a transmittance of 15%~60%.

4. The rearview/display mirror assembly according to claim 1 wherein said display is a planar display.

5. The rearview/display mirror assembly according to claim 4 wherein said display is one selected from a group consisting of a thin-film electro-luminescence (EL) display, a light-emitting diode (LED), an organic light-emitting diode (OLED), a liquid crystal display (LCD) and a vacuum fluorescent display (VFD).

6. The rearview/display mirror assembly according to claim 4 wherein said display is a digit planar display.

7. The rearview/display mirror assembly according to claim 6 wherein said display is a thin-film seven-segment display.

8. The rearview/display mirror assembly according to claim 1 further comprising a light-absorbing background, disposed at a side of said reflective layer opposite to said mirror for absorbing the external light penetrating through said reflective layer so as to avoid the interruption with the display of said image of said object on said mirror.

9. The rearview/display mirror assembly according to claim 1 being a vehicular rearview mirror.

10. The rearview/display mirror assembly according to claim 1 wherein said active information includes a rear clearance informed by back-warning radar, speed, revolving rate, heading direction, turning indication, door safety check, illumination check, temperature, UV index, stereo volume, radio channel and/or telephone number.

11. A rearview/display mirror assembly, comprising:

a rearview mirror for showing thereon an image of an object at the same side as a driver to be observed by the driver;

a display disposed at the back of the rearview mirror, and emitting light penetrating through the rearview mirror to provide an active information to be observed by the driver;

a metal/silicon dioxide composite layer disposed between said rearview mirror and said display, and having a transmittance of 15%~60%; and a light-absorbing background disposed at a side of said metal/silicon dioxide composite layer opposite to said rearview mirror for absorbing the external light penetrating through said metal/silicon dioxide composite layer.

12. The rearview/display mirror assembly according to claim 11 wherein said metal in said metal/silicon dioxide composite layer is selected from aluminum, silver or chromium.

13. A rearview/display mirror assembly, comprising:

a rearview mirror for showing thereon an image of an object at the same side as a driver to be observed by the driver;

a display disposed at the back of the rearview mirror, and emitting light penetrating through the rearview mirror to provide an active information to be observed by the driver;

a metal/titanium dioxide composite layer disposed between said rearview mirror and said display, and having a transmittance of 15%~60%; and a light-absorbing background disposed at a side of said metal/silicon dioxide composite layer opposite to said rearview mirror for absorbing the external light penetrating through said metal/titanium dioxide composite layer.

14. The rearview/display mirror assembly according to claim 13 wherein said metal in said metal/titanium dioxide composite layer is selected from aluminum, silver or chromium.

* * * * *